United States Patent [19]

Yen

[11] Patent Number: 4,767,522

[45] Date of Patent: Aug. 30, 1988

[54] DISTILLATE DEWAXING PROCESS WITH MIXED ZEOLITES

[75] Inventor: Jeffrey H. Yen, Swedesboro, N.J.

[73] Assignee: Mobil Oil Corporation, New York, N.Y.

[21] Appl. No.: 70,084

[22] Filed: Jul. 6, 1987

Related U.S. Application Data

[63] Continuation of Ser. No. 675,496, Nov. 28, 1984, abandoned.

[51] Int. Cl.$^4$ ............................................. C10G 45/64
[52] U.S. Cl. ........................................ 208/111; 208/120
[58] Field of Search ................ 208/111, 120; 585/739; 502/67

[56] References Cited

U.S. PATENT DOCUMENTS

| | | | |
|---|---|---|---|
| 3,308,069 | 3/1967 | Wadlinger et al. | 502/62 |
| 3,392,108 | 7/1968 | Mason et al. | 208/111 |
| 3,755,145 | 8/1973 | Orkin | 208/111 |
| 3,758,402 | 9/1973 | Oleck et al. | 208/111 |
| 3,758,403 | 9/1973 | Rosinski et al. | 208/120 |
| 3,761,396 | 9/1973 | Pickert | 208/111 |
| 3,764,520 | 10/1973 | Kimberlin et al. | 208/111 |
| 3,894,938 | 7/1975 | Gorring et al. | 208/97 |
| 3,923,641 | 12/1975 | Morrison | 208/111 |
| 4,089,775 | 5/1978 | Berger et al. | 208/111 |
| 4,176,050 | 11/1979 | Chen et al. | 208/111 |
| 4,181,598 | 1/1980 | Gillespie et al. | 208/58 |
| 4,289,606 | 9/1981 | Gladrow et al. | 208/120 |
| 4,309,280 | 1/1982 | Rosinski et al. | 208/135 |
| 4,340,465 | 7/1982 | Miller et al. | 208/120 |
| 4,359,378 | 11/1982 | Scott | 208/120 |
| 4,368,114 | 1/1983 | Chester et al. | 208/120 |
| 4,374,296 | 2/1983 | Haag et al. | 208/138 |
| 4,419,220 | 12/1983 | La Pierre et al. | 208/111 |
| 4,423,265 | 12/1983 | Chu et al. | 208/950 |
| 4,428,819 | 1/1984 | Shu et al. | 208/46 |
| 4,486,296 | 12/1984 | Oleck et al. | 208/111 |
| 4,575,416 | 3/1986 | Chester et al. | 208/111 |

FOREIGN PATENT DOCUMENTS 5121802 5/1976 Japan ........................... 585/739

*Primary Examiner*—Olik Chaudhuri
*Attorney, Agent, or Firm*—Alexander J. McKillop; Michael G. Gilman; Malcolm D. Keen

[57] ABSTRACT

Waxy distillate feedstocks are dewaxed by passing the waxy feedstock over a catalyst bed containing a mixture of medium pore zeolite and large pore zeolites having a Constraint Index less than 2 and having hydroisomerization activity in the presence of a hydrogenation component.

17 Claims, No Drawings

DISTILLATE DEWAXING PROCESS WITH MIXED ZEOLITES

This is a continuation of copending application Ser. No. 675,496, filed on Nov. 28, 1984, now abandoned.

BACKGROUND OF THE INVENTION

1. Field of the Invention

This invention relates to a process for dewaxing hydrocarbon oils, and particularly to a distillate dewaxing process.

2. Discussion of the Prior Art

Processes for dewaxing petroleum distillates have been known for a long time. Dewaxing is, as is well known, required when highly paraffinic oils are to be used in products which need to remain mobile at low temperatures, e.g., lubricating oils and jet fuels. The higher molecular weight straight chain normal and slightly branched paraffins which are present in oils of this kind are waxes which are the cause of high pour points in the oils and, if adequately low pour points are to be obtained, these waxes must be wholly or partly removed. In the past, various solvent removing techniques were used, e.g., propane dewaxing and MEK dewaxing, but the decrease in demand for petroleum waxes as such, together with the increased demand for gasoline and distillate fuels, has made it desirable to find processes which not only remove the waxy components, but which also convert these components into other materials of higher value.

Catalytic dewaxing processes achieve this end by selectively cracking the longer chain n-paraffins to produce lower molecular weight products which may be removed by distillation. Processes of this kind are described, for example, in *The Oil and Gas Journal*, Jan. 6, 1975, pages 69–73 and U.S. Pat. No. 3,668,113.

In order to obtain the desired selectivity, the catalyst has usually been a zeolite having a pore size which admits the straight chain n-paraffins, either alone or with only slightly branched chain paraffins, but which excludes more highly branched materials, cycloaliphatics and aromatics. Zeolites, such as ZSM-5, ZSM-11, ZSM-12, ZSM-23, ZSM-35 and ZSM-38, have been proposed for this purpose in dewaxing processes, and their use is described in U.S. Pat. Nos. 3,894,938; 4,176,050; 4,181,598; 4,222,855; 4,229,282 and 4,247,388. A dewaxing process employing synthetic offretite is described in U.S. Pat. No. 4,259,174. A hydrocracking process employing Zeolite Beta as the acidic component is described in U.S. Pat. No. 3,923,641.

U.S. Pat. No. 3,755,138 describes a process for mild solvent dewaxing to remove high quality wax from a lube stock, which is then catalytically dewaxed to specification pour point.

U.S. Pat. No. 4,053,532 is directed towards a hydrodewaxing operation involving a Fischer-Tropsch synthesis product utilizing ZSM-5 type zeolites.

U.S. Pat. No. 3,956,102 is connected with a process involving the hydrodewaxing of petroleum distillates utilizing a ZSM-5 type zeolite catalyst.

U.S. Pat. No. 4,247,388 describes dewaxing operations utilizing ZSM-5 type zeolites of specific activity.

U.S. Pat. No. 4,222,855 describes dewaxing operations to produce lubricating oils of low pour point and of high viscosity index utilizing zeolites including ZSM-23 and ZSM-35.

U.S. Pat. No. 4,372,839 describes a method for dewaxing crude oils of high wax content by contacting the oils with two different zeolites, e.g., ZSM-5 and ZSM-35.

U.S. Pat. No. 4,419,220 describes a distillate dewaxing process utilizing a Zeolite Beta catalyst.

U.S. Pat. No. 4,575,416 describes a lubricating oil dewaxing process utilizing a zeolite catalyst having a Constraint Index not less than 2; an acidic catalytic material selected from the group consisting of Mordenite, TEA Mordenite, Dealuminized Y, Rare Earth Y, amorphous silica alumina, chlorinated alumina, ZSM-4 and ZSM-20; and a hydrogenation component.

Copending U.S. patent application Ser. No. 614,072, now abandoned, describes a lubricating oil dewaxing process employing a mixture of a medium pore zeolite and a large pore zeolite.

The entire contents of these patents and application are herein incorporated by reference.

It is thus apparent that there are catalysts in the prior art useful for dewaxing engine oil, and specifically for dewaxing distillate fractions. However, it has been found that the use of composite catalyst in distillate dewaxing processes result in higher yields under better reaction conditions than the prior art.

It is an object of the present invention to overcome the deficiencies of the prior art.

It is additionally an object of the present invention to provide an improved process for catalytically dewaxing a waxy distillate feedstock.

These and other objects are fulfilled by the present invention, which is disclosed below.

SUMMARY OF THE INVENTION

The present invention is directed to a process for catalytically dewaxing a distillate hydrocarbon feedstock to gasoline and distillate products in which the feedstock is contacted with a catalyst comprising a crystalline silicate medium pore zeolite, a crystalline silicate large pore zeolite having a Constraint Index less than 2 and having hydroisomerization activity, and a hydrogenation component, wherein the ratio of the large pore zeolite to the medium pore zeolite determines the ratio of gasoline and distillates produced.

The present invention is further directed to a process for catalytically dewaxing distillate oil feedstocks to products comprising gasoline and distillates comprising contacting the feedstock at a temperature between about 450° F. (232° C.) and about 750° F. (399° C.) and a pressure between about 100 and 1500 psig with a catalyst in the presence of hydrogen in which the hydrogen-to-feedstock ratio is between about 500 and 8000 standard cubic feet of hydrogen per barrel of feed, the catalyst comprising from about 5 to 60 wt % medium pore zeolite, from about 5 to 60 wt % Zeolite Beta, from about 0 to about 50 wt % binder, and from about 0.1 to 5 wt % finely dispersed noble metal selected from any of Group VI, VII and VIII of the Periodic Table and mixtures thereof, wherein the ratio of Zeolite Beta to the medium pore zeolite determines the ratio of gasoline to distillates produced. The feedstock is contacted with the catalyst in a fixed bed at a liquid hourly space velocity between about 0.1 and 10.

DESCRIPTION OF PREFERRED EMBODIMENTS

The present process may be used to dewax a variety of waxy distillate stocks, such as gas oils, kerosenes, jet fuels, heating oils and other distillate fractions whose pour point and viscosity need to be maintained within certain specification limits. Distillate fractions contain significant amounts of waxy n-paraffins which result from the removal of polycyclic aromatics. The feedstock for the present process will normally be a $C_{10}+$ feedstock containing paraffins, olefins, naphthenes, aromatics and heterocyclic compounds, and with a substantial proportion of higher molecular weight n-paraffins and slightly branched paraffins which contribute to the waxy nature of the feedstock. During the processing, the n-paraffins become isomerized to isoparaffins, and the slightly branched paraffins undergo isomerization to more highly branched aliphatics. At the same time, a measure of cracking does take place so that not only is the pour point reduced by reason of the isomerization of n-paraffins to the less waxy branched chain iso-paraffins but, in addition, the heavy ends undergo some cracking or hydrocracking to form liquid range materials which contribute to a low viscosity product. The degree of cracking which occurs is, however, limited so that the gas yield is reduced, thereby preserving the economic value of the feedstock.

In general, hydrodewaxing conditions include a temperature between about 450° F. (232° C.) and about 850° F. (454° C.), a pressure between 0 and about 3000 psig and preferably between about 100 and about 1000 psig. The liquid hourly space velocity (LHSV), i.e., the volume of feedstock per volume of catalyst per hour, is generally between about 0.1 and about 10 and preferably between 0.2 and about 4; and the hydrogen-to-feedstock ratio is generally between about 500 and about 8000 and preferably between about 800 and 5000 standard cubic feet (scf) of hydrogen per barrel of feed.

The catalytic dewaxing process of this invention may be conducted by contacting the fed to be dewaxed with a fixed stationary bed of the defined crystalline silicate zeolite catalysts, a slurry bed or with a transport bed, as desired.

The catalyst used in this process comprises a medium pore crystalline silicate zeolite and a large pore crystalline silicate zeolite having a Constraint Index less than 2 and having hydroisomerization activity, e.g., Zeolite Beta, preferably in combination, with a hydrogenation component. Without wishing to be restricted to a certain theory, it is believed that a combination of a medium pore zeolite and a large pore zeolite, in the right proportion will offer superior dewaxing activities and product yields than the distillate dewaxing catalysts of the prior art.

A portion of the novel class of zeolites useful herein are termed medium or intermediate pore zeolites and have an effective pore size of generally less than about 7 angstroms, such as to freely sorb normal hexane. By "effective pore size" it is meant that the pores of the medium pore zeolite behave in the same fashion as perfectly cylindrical pores, generally less than 7 angstroms in size. Thus, a medium pore zeolite may have pores in excess of 7 angstroms in size as long as the shape of the pores renders an effective pore size no greater than 7 angstroms in size. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Another class of zeolites important to the present invention, i.e., large pore zeolites, are well known to the art and have a pore size sufficiently large to admit the vast majority of components normally found in a feed chargestock. These zeolites are generally stated to have a pore size in excess of about 7 angstroms and are represented by, e.g., Zeolite Y, Mordenite, ZSM-4, ZSM-20 and Zeolite Beta.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, to which reference is made for details of the method.

Constraint index (CI) values for typical medium pore zeolites, including those useful herein, are:

| Crystalline Silicate | CI |
|---|---|
| ZSM-5 | 6–8.3 |
| ZSM-11 | 6–8.7 |
| ZSM-12 | 2 |
| ZSM-23 | 9.1 |
| ZSM-38 | 2 |
| ZSM-35 | 4.5 |
| ZSM-48 | 3.4 |
| TMA Offretite | 3.7 |

Suitable large pore zeolites include Zeolite Beta, ZSM-4, ZSM-20, Mordenite, TEA Mordenite, Dealuminized Y, and Rare Earth Y (REY), but not crystalline alumina, chlorinated alumina and silica-alumina. Constraint Index values for these materials are:

| ZSM-4 | 0.5 |
|---|---|
| ZSM-20 | 0.5 |
| Mordenite | 0.5 |
| TEA Mordenite | 0.4 |
| Dealuminized Y | 0.5 |
| REY | 0.4 |
| Zeolite Beta | 0.6–1+ |

Additionally, the large pore component may include a low sodium Ultrastable Y molecular sieve (USY). USY is well known to the art and is described in U.S. Pat. Nos. 3,293,192 and 3,449,070.

The above-described Constraint Index is an important and even critical definition of these zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may effect the Constraint Index. Therefore, it will be appreciated that it may be possible to so select test conditions as to establish more than one value for the Constraint Index of a particular zeolite. This explains the range of Constraint Indices for zeolites, such as ZSM-5, ZSM-11, ZSM-34 and Zeolite Beta.

Zeolite ZSM-4 is taught by U.S. Pat. No. 3,923,639, the disclosure of which is incorporated herein by reference.

Zeolite ZSM-5 is taught by U.S. Pat. No. 3,702,886 and U.S. Pat. No. Re. 29,949, the disclosures of which are incorporated herein by reference.

Zeolite ZSM-11 is taught by U.S. Pat. No. 3,709,979, issued Jan. 9, 1973, the disclosure of which is incorporated herein by reference.

Zeolite ZSM-12 is taught by U.S. Pat. No. 3,832,449, issued Aug. 27, 1974, the disclosure of which is incorporated herein by reference.

Zeolite ZSM-20 is taught by U.S. Pat. No. 3,972,983, the disclosure of which is incorporated herein by reference.

Zeolite ZSM-23 is taught by U.S. Pat. No. 4,076,842, the disclosure of which is incorporated herein by reference.

Zeolite ZSM-34 is described in U.S. Pat. No. 4,086,186, the disclosure of which is incorporated herein by reference.

Zeolite ZSM-35 is described in U.S. Pat. No. 4,016,245, the disclosure of which is incorporated herein by reference.

Zeolite ZSM-38 is described in U.S. Pat. No. 4,046,859, the disclosure of which is incorporated herein by reference.

Zeolite ZSM-48 is described in U.S. Pat. No. 4,397,827, the disclosure of which is incorporated herein by reference.

Zeolite Beta is described in U.S. Pat. No. 3,308,069 and U.S. Pat. No. Re. 28,341, the disclosures of which are incorporated herein by reference.

An exceptionally suitable large pore material is Zeolite Beta. It is to be noted that Zeolite Beta does not have the same structure as the other listed large pore zeolites. However, all of these zeolites provide hydroisomerization activity. The use of the large pore catalysts and Zeolite Beta in a hydroisomerization activity is disclosed in U.S. Pat. Nos. 4,419,220 and 4,428,819, the entire contents of which are incorporated herein by reference. The large pore hydroisomerization catalysts comprise an acidic component and a hydrogenation-dehydrogenation component (referred to, for convenience, as a hydrogenation component) which is generally a metal or metals of Groups IB, IIB, VA, VIA or VIIIA of the Periodic Table (IUPAC and U.S. National Bureau of Standards approved Table, as shown, for example, in the Chart of the Fisher Scientific Company, Catalog No. 5-702-10). The preferred hydrogenation components are the noble metals of Group VIIIA, especially platinum, but other noble metals, such as palladium, gold, silver, rhenium or rhodium, may also be used. Combinations of noble metals, such as platinum-rhenium, platinum-palladium, platinum-iridium or platinum-iridium-rhenium, together with combinations with non-noble metals, particularly of Groups VIA and VIIIA are of interest, particularly with metals such as cobalt, nickel, vanadium, tungsten, titanium and molybdenum, for example, platinum-tungsten, platinum-nickel or platinum-nickel-tungsten. Base metal hydrogenation components may also be used, especially nickel, cobalt, molybdenum, tungsten, copper or zinc. Combinations of base metals, such as colbalt-nickel, cobalt-molybdenum, nickel-tungsten, colbalt-nickel-tungsten or cobalt-nickel-titanium, may also be used.

The metal may be incorporated into the catalyst by any suitable method, such as impregnation or exchange, onto the zeolite. The metal may be incorporated in the form of a cationic, anionic or neutral complex, such as $Pt(NH_3)_4^{2+}$, and cationic complexes or this type will be found convenient for exchanging metals onto the zeolite. Anionic complexes are also useful for impregnating metals into the zeolites.

The crystalline zeolite used in the catalyst of the present invention generally comprise a three-dimensional lattice of $SiO_4$ tetrahedra, cross-linked by the sharing of oxygen atoms and which may optionally contain other atoms in the lattice, especially aluminum in the form of $AlO_4$ tetrahedra; the zeolite will also include a sufficient cationic complement to balance the negative charge on the lattice. Acidic functionality may, of course, be varied by artifices including base exchange, steaming or control of silica:alumina ratio.

The isomerization reaction is one which requires a relatively small degree of acidic functionality in the catalyst. Because of this, the zeolite may have a very high silica:alumina ratio since this ratio is inversely related to the acid site density of the catalyst. Thus, structural silica:alumina ratios of 50:1 or higher are preferred and, in fact, the ratio may be much higher, e.g., 100:1, 200:1, 500:1, 1000:1, or even higher. Since zeolites are known to retain their acidic functionality even at very high silica:alumina ratios of the order of 25,000:1, ratios of this magnitude or even higher are contemplated.

The original cations associated with each of the crystalline silicate zeolites utilized herein may be replaced by a wide variety of other cations according to techniques well known in the art. Typical replacing cations include hydrogen, ammonium, alkyl ammonium and metal cations, including mixtures of the same. Of the replacing metallic cations, particular reference is given to cations of metals such as rare earth metals, manganese, as well as metals of Group II A and B of the Periodic Table, e.g., zinc, and Group VIII of the Periodic Table, e.g., nickel, platinum and palladium.

Typical ion exchange techniques are to contact the particular zeolite with a salt of the desired replacing cation. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251; and 3,140,253.

Following contact with a solution of the desired replacing cation, the zeolite is then preferably washed with water and dried at a temperature ranging from 150° F. (65° C.) to about 600° F. (315° C.) and thereafter calcined in air, or other inert gas at temperatures ranging from about 500° F. (260° C.) to 1500° F. (815° C.) for periods of time ranging from 1 to 48 hours or more. It has been further found that zeolites of improved selectivity and other beneficial properties may be obtained by subjecting the zeolite to treatment with steam at elevated temperatures ranging from 500° F. (260° C.) to 1200° F. (649° C.), and preferably 750° F. (399° C.) to 1000° F. (538° C.). The treatment may be accomplished in an atmosphere of 100% steam or an atmosphere consisting of steam and a gas which is substantially inert to the zeolites.

A similar treatment can be accomplished at lower temperatures and elevated pressure, e.g., 350°-700° F. (177°-371° C.) at 10 to about 200 atmospheres. The crystalline silicate zeolite utilized in the process of this invention is desirably employed in intimate combination with one or more hydrogenation components, such as tungsten, vanadium, zinc, molybdenum, rhenium, nickel, cobalt, chromium, manganese, or a noble metal such as platinum or palladium, in an amount between about 0.1 and about 25% by weight, normally 0.1 to 5% by weight especially for noble metals, and preferably 0.3 to 1% by weight. The component can be exchanged into the composition, impregnated thereon or physically intimately admixed therewith. The component can be impregnated into or onto the zeolite, such as, for example, in the case of platinum, by treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$, is particularly useful.

Prior to use, the zeolites should be dehydrated at least partially. This can be done by heating to a temperature in the range of 390° F. (200° C.) to 1112° F. (600° C.) in an inert atmosphere, such as air, nitrogen, etc., and at atmospheric or subatmospheric pressures for between 1 and 48 hours. Dehydration can also be performed at lower temperatures merely by using a vacuum, but a longer time is required to obtain sufficient amount of dehydration.

A preferred method for preparing the zeolite is to blend the zeolite with an inorganic oxide, such as alumina hydrates, form the composite into extrudates, dry the extrudate and calcine in an atmosphere such as nitrogen or air. The extrudate may then be exchanged with cations, such as ammonium, and recalcined, prior to adding a hydrogenation component, such as metals of Groups VI, VII, and VIII of the Periodic Table, e.g., platinum, molybdenum, nickel and cobalt. The addition of the hydrogenation component may be accomplished by impregnation, ion exchange or other conventional methods. Drying and calcining subsequent to the addition of the hydrogenation component is then used to complete the preparation.

While it is understood that the process of the present invention may be accomplished by utilizing a catalyst incorporating any of the previously-mentioned large pore zeolites, the preparation and process of using the novel catalyst of the present invention will be exemplified using Zeolite Beta as the large pore zeolite.

The catalysts of this invention are typically prepared by mulling together from about 5 to 60% by weight, preferably 20 to 40% by weight, medium pore zeolite ($SiO_2/Al_2O_3$ mole ratio of 70), from about 5 to 60% by weight, preferably 20 to 40% by weight, large pore zeolite, e.g., $NH_4$-Zeolite Beta ($SiO_2/Al_2O_3$ mole ratio of 30), and from 0 to about 50% by weight, preferably 0 to 40% by weight, binder, e.g., alpha alumina monohydrate. During the mulling process, a sufficient amount of water containing $H_2PtCl_6$ or $Pt(NH_3)_4(NO_3)_2$ is added slowly to the dry mulling mixture. The mulling process is continued for about 20 minutes or until the mixture is uniform. The mixture is then extruded and dried at 230° F. (110° C.) for approximately 3 hours. The extrudates are crushed and sized to 30/60 mesh material and calcined in air at 1000° F. (537° C.) for 3 hours. The catalyst thus produced contains from about 0.1 to 2% by weight, preferably 0.3 to 1% by weight of finely dispersed platinum. It is to be understood that metal cations other than platinum may be incorporated into the catalyst.

The following examples will serve to illustrate the process of the invention without limiting the same.

CHARGESTOCK

The chargestock used in the following examples was Minas gas oil having the following properties:

| | |
|---|---|
| Gravity, °API | 35.1 |
| Pour Point, °F. (°C.) | 95 (35) |
| Cloud Point, °F. (°C.) | 120* (50*) |
| KV at 40° C., cs | 8.671 |
| KV at 100° C., es | 2.534 |
| Sulfur, wt % | 0.068 |
| Nitrogen, ppm | 180 |
| Basic Nitrogen, ppm | 74 |
| Hydrogen, wt % | 13.96 |
| Aniline Point | 202 |
| Bromine No. | 1.5 |
| Carbon Residue by MCRT, % | 0.02 |
| ASTM Color | L5.0 |
| $C_{10}+$ Non-Aromatic Type | |
| Paraffins, % | 45.3 |
| Mono Naphthenes, % | 16.0 |
| Poly Naphthenes, % | 17.0 |
| Aromatics, % | 21.8 |
| Simulated Distillation | |
| 0.5% Off | 259.2 |
| 5% | 520.8 |
| 10% | 546.2 |
| 20% | 597.9 |
| 30% | 635.8 |
| 40% | 666.9 |
| 50% | 694.2 |
| 60% | 722.4 |
| 70% | 752.4 |
| 80% | 789.8 |
| 90% | 852.4 |
| 95% | 936.8 |
| 99.5% | 1106 |

\* = Greater Than
L = Lighter Than

EXAMPLE 1

Example 1 illustrates the effect of steamed Ni-ZSM-5 catalyst on the chargestock as it was passed over the catalyst. The catalyst was loaded into a 15/32″ ID fixed-bed reactor, reduced under $H_2$ and presulfided with 2% $H_2S/H_2$ at 700° F. (371° C.). After the reactor temperature was lowered to the desired setting, the chargestock was then passed over the catalyst along with hydrogen under the controlled process conditions which are recited in Table 1. The product stream leaving the reactor was passed through a heated trap, a cold-water trap, and a gas-sampling bomb. The gas samples were analyzed by mass spectrometry for $C_1$-$C_6$ components. Liquid products were topped under less than 1 Torr pressure and maximum pot temperature of 285° F. (140° C.), to isolate the 330° F.+ product. Some of the topped samples were processed through a simulated distillator. The light liquid products, i.e., the condensate from the cold trap and the overhead from the topped samples, were analyzed by gas chromatography. Overall material balances were made based on total liquid feed charge plus hydrogen. The results are recited in Table 1.

TABLE 1

| Reactor | |
|---|---|
| Temperature, °F. (°C.) | 721 (383) |
| Pressure, psig | 400 |
| LHSV | 1 |
| Pour Point, °F. (°C.) | 20 (−6) |
| Product Selectivity, wt % | |
| $C_1$ + $C_2$ | 0.4 |
| $C_3$ | 3.0 |
| $C_4$ | 6.6 |
| $C_5$ − 330° F. | 24.9 |
| 330° F.+ | 65.1 |

EXAMPLE 2

Example 2 illustrates the effect of a 0.5% Pt-Zeolite Beta catalyst on the chargestock. The platinum catalyst was reduced in situ at 900° F. (482° C.) and 400 psig of hydrogen for one hour before introducing the feed into the reactor. The procedure of Example 1 was followed under conditions specified in Table 2, which also recites the results.

TABLE 2

| Reactor | |
|---|---|
| Temperature, °F. (°C.) | 795 (424) |
| Pressure, psig | 400 |
| LHSV | 1 |
| Pour Point, °F. (°C.) | 20 (−6) |
| Product Selectivity, wt % | |
| $C_1$ + $C_2$ | 0.4 |
| $C_3$ | 0.6 |
| $C_4$ | 1.4 |
| $C_5$ − 330° F. | 7.3 |
| 330° F.+ | 90.3 |

EXAMPLE 3

Example 3 illustrates the effect of 0.45% Pt-ZSM-5/Zeolite Beta on the chargestock. The composition of the catalyst is as follows:

| Component | Wt. % |
|---|---|
| $NH_4$ ZSM-5 | 32.5 |
| $NH_4$ Zeolite Beta | 32.5 |
| Alpha Alumina Monohydrate (binder) | 35 |
| Platinum | .44 |

The procedure of Example 2 was followed under conditions specified in Table 3, which also recites the results.

TABLE 3

| Reactor | |
|---|---|
| Temperature, °F. (°C.) | 740 (393) |
| Pressure, psig | 400 |
| LHSV | 1 |
| Pour point, °F. (°C.) | 20 (−6) |
| Product Selectivity, wt % | |
| $C_1$ + $C_2$ | 0.2 |
| $C_3$ | 3.2 |
| $C_4$ | 3.3 |
| $C_5$ − 330° F. | 19.6 |
| 330° F.+ | 73.7 |

It is apparent from the Examples that the catalyst of the present invention is intermediate in distillate selectivity and activity between a distillate dewaxing catalyst, Ni-ZSM-5, and the catalyst Zeolite Beta. The Pt-ZSM-5/Zeolite Beta catalyst produced a 330° F.+ yield of 73.7 wt % at a 20° F. pour point, compared to a 65.1 wt % yield with Ni-ZSM-5 catalyst and a 90.3 wt % yield with the Zeolite Beta catalyst. The activity of the Pt-ZSM-5/Zeolite Beta catalyst was only 20° F. less than for the Ni-ZSM-5 catalyst, but 55° F. more than for the Zeolite Beta catalyst.

The improved distillate selectivity and reduced light gas make of the Pt-ZSM-5/Zeolite Beta catalyst relative to the Ni-ZSM-5 catalyst and the more favorable reactor temperature conditions of the Pt-ZSM-5/Zeolite Beta catalyst relative to the Zeolite Beta catalyst thus makes the catalyst of the present invention a favorable replacement for each of the comparative catalysts in a distillate dewaxing process.

The gasoline-to-distillate yield ratio in the product can be varied with the content of the medium pore zeolite and/or large pore zeolite in the catalyst. It can be seen from the examples that a feedstock reacted over a medium pore zeolite produces a greater yield of gasoline ($C_5$-330° F.) than the feedstock reacted over a larger pore zeolite (24.9 wt % vs. 8.0 wt %). However, the reverse is true with respect to distillate yield (65.1 wt % vs. 90.3 wt %). Thus, it is an additional feature of the present invention that that ratio of gasoline product to distillate product yield is controlled by controlling the composition of the catalyst. If a greater gasoline-to-distillate yield ratio is desired, then the ratio of medium pore zeolite to large pore zeolite should be increased. Alternatively, a larger distillate-to-gasoline yield ratio requires an increased ratio of large pore zeolite to medium pore zeolite in the catalyst.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A process for catalytically dewaxing a gas oil feedstock to gasoline and dewaxed distillate products, comprising contacting said feedstock in the presence of hydrogen and at a temperature from 450° to 750° F. with a catalyst comprising a crystalline silicate medium pore zeolite having a Constraint Index between 2 and 12, 5 to 60 weight percent zeolite beta and a hydrogenation component, to produce a higher yield of distillate products relative to the use of the medium pore zeolite and a lower temperature relative to the use of the zeolite beta for the same distillate product pour point.

2. The process according to claim 1, in which said feedstock is highly paraffinic Minas gas oil.

3. The process of claim 1, wherein said medium pore zeolite is selected from the group having the structure of ZSM-5, ZSM-11, ZSM-12, ZSM-23, ZSM-35, ZSM-38, ZSM-48 and TMA Offretite.

4. The process of claim 1, wherein said medium pore zeolite has the structure of ZSM-5.

5. The process according to claim 1, in which said hydrogenation component comprises a noble metal selected from any of Groups VI, VII and VIII of the Periodic Table and mixtures thereof.

6. The process according to claim 1, in which said contacting is effected in the presence of hydrogen.

7. The process according to claim 1, wherein said feedstock is contacted with said catalyst at a temperature between about 450° and about 750° F., a pressure between about 100 and about 5000 psig, and a liquid hourly space velocity between about 0.2 and about 4.

8. The process according to claim 1, wherein said feedstock is contacted with said catalyst on a fixed bed.

9. The process according to claim 1, wherein said feedstock is contacted with said catalyst on a transport bed.

10. The process according to claim 1, wherein said feed stock is contacted with said catalyst on a slurry bed.

11. The process according to claim 1, wherein said catalyst comprises from about 20 to about 40 wt. % medium pore zeolite and from about 20 to about 40 wt. % zeolite beta.

12. A process for catalytically dewaxing gas oil feedstocks to products comprising gasoline and distillates, said process comprising contacting said feedstock at a temperature between about 450° F. and about 750° F. and a pressure between about 100 and 1000 psig with a catalyst in the presence of hydrogen in which the hydrogen-to-feedstock ratio is between about 500 and 8000 standard cubic feet of hydrogen per barrel of feed, said catalyst comprising from about 5 to 60 wt % medium pore zeolite, from about 5 to 60 wt % Zeolite Beta, from about 0 to about 50 wt % binder, and from about 0.1 to 5 wt % finely dispersed noble metal selected from any of Groups VI, VII and VIII of the Periodic Table and mixtures thereof, said feedstock being contacted with said catalyst in a fixed bed at a liquid hourly space velocity between about 0.1 and 10, to produce a higher yield of distillate products relative to the use of the medium pore zeolite and a lower temperature relative to the use of the zeolite beta for the same distillate product pour point and recovering a dewaxed product.

13. The process according to claim 12, wherein said catalyst comprises from about 20 to about 40 wt. % medium pore zeolite, from about 20 to about 40 wt. % Zeolite Beta, from 0 to about 40 wt. % binder, and from about 0.3 to 1 wt. % finely dispersed platinum.

14. The process according to claim 12, wherein said binder is selected from the group consisting of alpha-alumina, silica, silica-alumina, naturally-occurring clays and mixtures thereof.

15. The process according to claim 12, wherein the silica-to-alumina ratio of medium pore zeolite is at least 12:1.

16. The process according to claim 12, wherein the silica-alumina ratio of Zeolite Beta is at least 10:1.

17. The process according to claim 12, wherein said medium pore zeolite is selected from the group having the structure of ZSM-5, ZSM-11, ZSM-12, ZSM-23, ZSM-35, ZSM-38, ZSM-48 and TMA Offretite.

* * * * *